United States Patent [19]

Teramura et al.

[11] 4,296,439
[45] Oct. 20, 1981

[54] DIGITAL SIGNAL CONTROL SYSTEM IN A FACSIMILE COMMUNICATION

[75] Inventors: Hiroichi Teramura, Tokyo; Yasuhiro Yamazaki, Hiratsuka; Yasushi Wakahara, Tokyo; Naohiko Hattori, Tokyo; Seiichi Yamamoto, Tokyo; Kouzo Nakao, Hoya, all of Japan

[73] Assignee: Kokusai Denshin Denwa Co., Ltd., Tokyo, Japan

[21] Appl. No.: 150,100

[22] Filed: May 15, 1980

Related U.S. Application Data

[63] Continuation-in-part of Ser. No. 917,163, Jun. 20, 1978, abandoned.

[30] Foreign Application Priority Data

Jun. 20, 1977 [JP] Japan .................................. 52-71995

[51] Int. Cl.³ ............................................. H04N 7/12
[52] U.S. Cl. ................................... 358/257; 358/260; 358/264; 371/57
[58] Field of Search ................ 358/133, 260, 261, 257, 358/263, 264; 371/47, 57

[56] References Cited

U.S. PATENT DOCUMENTS

| | | | |
|---|---|---|---|
| 3,777,066 | 12/1973 | Nicholas | 178/69.1 |
| 3,830,966 | 8/1974 | Aldrich et al. | 358/261 |
| 3,914,538 | 10/1975 | Perreault et al. | 358/257 |
| 4,000,371 | 12/1976 | Ogawa | 358/257 |
| 4,070,694 | 1/1978 | Sakamoto et al. | 358/261 |
| 4,131,915 | 12/1978 | Nakagome et al. | 358/261 |

OTHER PUBLICATIONS

Donnan, Transmission Synchronizing Method, IBM Tech Disclosure Bulletin, vol. 11, #11 Apr. 1969, p. 1570.

*Primary Examiner*—Joseph A. Orsino, Jr.
*Attorney, Agent, or Firm*—Armstrong, Nikaido, Marmelstein & Kubovcik

[57] ABSTRACT

In a digitalized facsimile transmission system, (k) number of scanning lines (k=2 or 4) are encoded to a relative address code and the next scanning line is encoded to a run length code, and each scanning line has the related synchronization code pattern corresponding either said relative address code or said run length code. Thus, the effect of a transmission error is restricted within one scanning line when that error occurs in the scanning line encoded to run length code, or k lines when that error occurs in the scanning line encoded to relative address code. The value (k) is switched between k=2 and k=4 according to the instantaneous quality of a communication line. When the quality is good, k=4 is selected, and when the quality is bad, k=2 is selected. The reception side can switch the decoding systems between relative address decode and run length decode, by being controlled through the related synchronization code patterns.

A synchronization code pattern has a plurality of 0's inserted between a pair of 1's (1000 ... 0001), and the number of 0's between said 1's indicates one of relative address code and run length code.

In order to discriminate a facsimile information from a synchronization code pattern, when the facsimile information has the more continuous 0's than (n), an idle signal having the value "1" is inserted in every (n-1) number of continuous 0's of the facsimile information. Said idle signal is deleted automatically in the receiver.

5 Claims, 4 Drawing Figures

4,296,439

DIGITAL SIGNAL CONTROL SYSTEM IN A FACSIMILE COMMUNICATION

COPENDING APPLICATION

This application is the continuation-in-part application of the U.S. Patent application Ser. No. 917,163, June 20, 1978 which is now abandoned.

BACKGROUND OF THE INVENTION

The present invention relates to a digitalized facsimile communication system.

In a digitalized facsimile communication system, a sequence of black or white picture elements in each scanning line is encoded into binary code and is transmitted. The typical encoding systems are relative address code and run length code. The former is excellent for information suppressing, and can transmit a picture signal quickly, but has the disadvantage that when a transmission error occurs, that error disturbs the whole picture. The latter has less information suppressing effect but has the advantage that the effect of a transmission error is restricted within a single scanning line.

Accordingly, the disadvantage of a prior digitalized facsimile communication system is that the encoding system is fixed, and so the information suppressing and/or the transmission speed of a digitalized facsimile signal is not the best for the instantaneous transmission error rate.

SUMMARY OF THE INVENTION

It is an object of the present invention to provide an improved digitalized facsimile communication system by overcoming the disadvantage of a prior art.

Another object of the present invention is to provide a digitalized facsimile communication system which takes the suitable encoding system according to the instantaneous communication quality.

According to the present invention, the scanning lines of a picture signal are encoded so that (k) number of continuous scanning lines are encoded by a relative address encoding system and the next one scanning line is encoded by run length encoding system and that sequence is repeated, a pair of synchronization codes are defined for each encoding system, and each synchronization code is positioned at the head of each scanning line of a picture signal, each of the synchronization codes have $m_1$ and $m_2$ number of continuous 0's inserted between a pair of 1's, a facsimile transmission station interpolates "1" for each series of $(MIN(m_i)-1)$ number of continuous 0's of the picture signal in order to distinguish the picture signal from synchronization codes where $MIN(m_i)$ is the minimum value among $m_i$ and i is 1 or 2, and a receiving station eliminates the interpolated "1" to provide a clean output, wherein the value of (k) is switched according to the instantaneous quality of a communication line so that the value (k) when said quality is good is larger than that when said quality is bad.

The relative address code and the run length code are the typical data suppression system, and the former is a representative example of the line-by-line encoding system, which consists of encoding each line referring to the immediately prior line information, and the latter is a representative example of the one dimensional encoding system, which consists of encoding each line without referring to the immediately prior line information.

The switching of the encoding systems is triggered by the information on receiving performance, e.g. the "condition of error in CRC check (cyclic redundancy check)", "the condition of SQD (signal quality detector)" and also by the information on the number of encoded bits after data suppression, etc. Also, that switching can be performed manually by an operator.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 3:
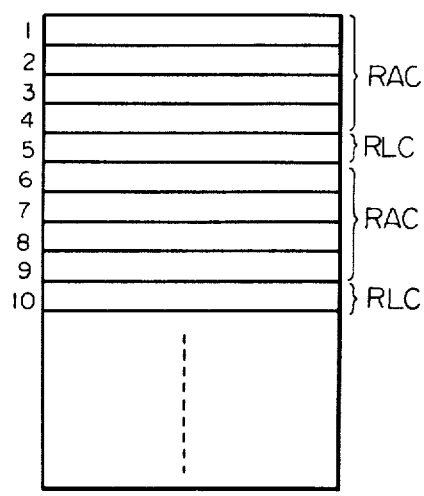
FIG. 3 shows the data suppressing system according to the present invention.

FIG. 3 shows the encoding system according to the present digitalized facsimile communication system. According to the present invention, the predetermined number (k) of continuous scanning lines (scanning lines 1 through 4 in the embodiment) are encoded to a relative address code (RAC), and the next scanning line (the scanning line 5) is encoded to a run length code (RLC). This operation is repeated, and thus, the scanning lines 6 through 9 are encoded to a relative address code, and the next scanning line 10 is encoded to a run length code. The relative address code has the superior data suppression effect, but when there is a transmission error, that error disturbs the whole area encoded by that system. Therefore, the present invention inserts the scanning line encoded by the run length code in every predetermined scanning lines (k), so that the effect of the error is restricted within the (k) number of scanning lines.

Preferably, the value (k) depends upon the instantaneous quality of a communication line so that when that quality is good, the value (k) is large, and when that quality is bad, the value (k) is small.

Preferably, that value (k) is switched automatically according to the instantaneous quality of a communication line. And preferably, the switching is carried out between k=2 and k=4.

Figure 1:
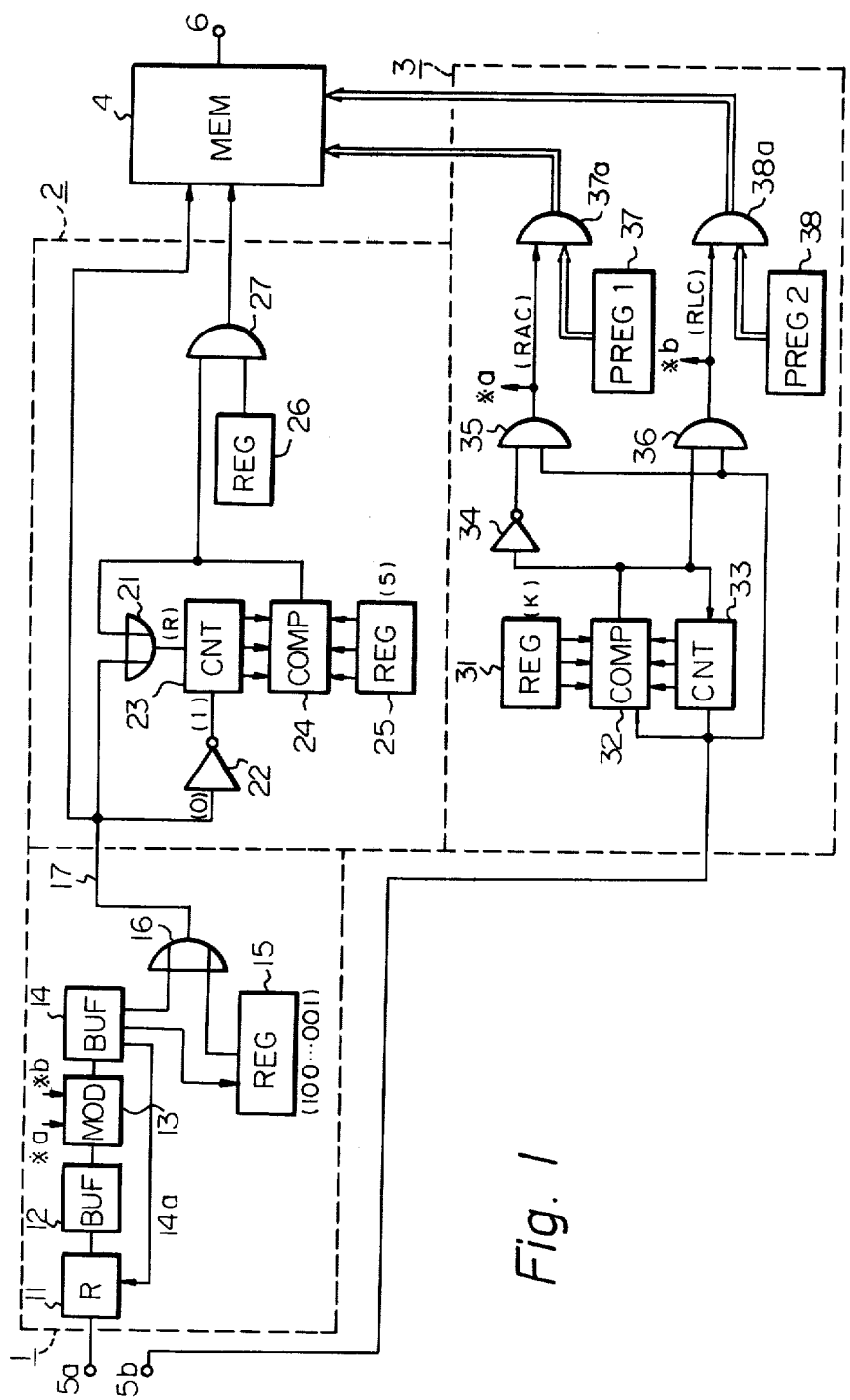
FIG. 1 is a block-diagram of the facsimile transmitter according to the present invention.

FIG. 1 is a block diagram of the present invention applied to the facsimile transmitter.

Figure 2:
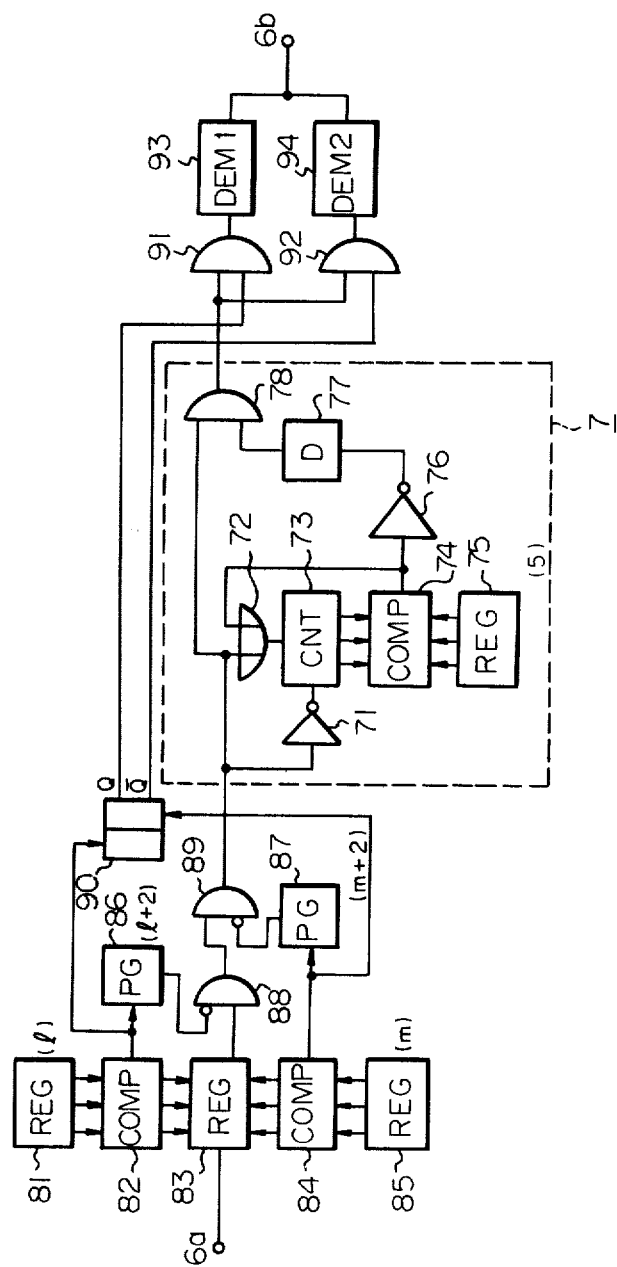
FIG. 2 is a block diagram of the facsimile receiver according to the present invention.

FIG. 2 illustrates a block diagram of this invention applied to the facsimile receiver.

In FIG. 1, the reference numeral 1 is the insertion circuit for a dummy code. 2 is the insertion circuit of "1". 3 indicates the synchronization signal generation circuit. All of the above noted circuits are not necessary in the application of the present invention. The dummy code insertion circuit 1 and/or the synchronization signal generation circuit can be eliminated.

The picture signal of facsimile in digital form is applied to the input terminal 5a. The timing pulse generated for each scanning line is applied to the input terminal 5b. The picture signal is applied to the encoder/- modulator (MOD) 13 via the read-out control unit (R) 11 and the input buffer (BUF) 12. Encoding for the purpose of data suppression is performed at the encoder/ modulator (MOD) 13. Encoding is performed following the RAC system (Relative Address Coding) when the control signal is on the line (a), and following RLC system (Run Length Coding) when the control signal is on line (b). The RAC system is a system of encoding the address of the changing point of white and black employing the distance from the reference point (the changing point which becomes the reference). The scanning information one line previous is used as the reference point. The RLC system is a transmission system wherein a number of continuous white or black picture elements are encoded and transmitted. The RAC system and the RLC system are disclosed in U.S. Pat. No. 4,040,093, in more detail.

The output from the encoder (MOD) 13 is brought to line 17 via the output buffer (BUF) 14 and OR-circuit 16. At this stage if the output buffer (BUF) 14 becomes full because of the relation between the transmission speed and the output speed of the encoder (MOD) 13, a control signal is transmitted to the read-out control unit (R) 11 via the line 14a and read-out is stopped. On the contrary, if the output buffer (BUF) becomes empty, a dummy code is supplied from the register (REG) 15. The pattern of the dummy code is composed of an n number of zeros with the signal "1" before and after, e.g. (1000 . . . 001). In this case the number of zeros may be different from the number of zeros in the synchronization code pattern. For example: when the number of zeros in the synchronization code is even (or odd) the number of zeros in the dummy code is odd (or even).

The "1" insertion circuit 2 is provided for the purpose of inserting "1" to the picture information as required in order to prevent confusion between the control code or the synchronization code and the picture signal.

When the control code is of the pattern composed of 6 zeros with the signal "1" before and after (10000001), "1" is to be inserted for every 5 unbroken continuous zeros in the picture information.

In FIG. 1, the register (REG) 25 is fed with the value (5) and the counter (CNT) 23 is to count the number of zeros applied through the inverter 22. Since said counter (CNT) 23 is to be reset by the output of the OR-circuit 21, it is reset to zero when the code 1 appears in picture information. Therefore, when five continuous zeros appear unbroken in picture information, the contents of the counter (CNT) 23 becomes 5 and the comparison circuit (COMP) 24 generates output. By this output, 1 is supplied from the register (REG) 26 via the AND-circuit 27 and is stored in the memory (MEM) 4 together with other picture information.

In the present embodiment, the synchronization signal generation circuit 3 switches the synchronization code pattern for every preset number (k) of scanning lines. In relation to this, the encoding system of picture information is switched. The switching is triggered by the number of scanning lines described above. Switching by the information related to receiving performance (the condition of CRC error or condition of SQD) is also possible. The pulse for every scanning line applied to the input terminal 5b, is applied to the counter (CNT) 33 and the AND-circuits 35, 36. Said counter (CNT) 33 counts the number of these pulses. When the counted value becomes equal to the contents K of the register (REG) 31, the comparison circuit (COMP) 32 generates output and said output resets the counter (CNT) 33.

This output is also applied to the AND-circuit 36, and is further applied to the AND-circuit 35 via the inverter 34. Therefore, the AND-circuit 36 generates one output pulse for every K scanning pulses. (K = integer). At the same time, the AND-circuit 35 generates output for every other scanning pulse. The pattern register (PREG 1) 37 and (PREG 2) 38 have in each storage a predetermined synchronization code pattern (1000 . . . 0001). Preferably, the first synchronization code pattern has (l) number of continuous 0's inserted between a pair of 1's and represents the relative address encoding, and the second synchronization code pattern has (m) number of 0's inserted between a pair of 1's and represents the run length encoding. Preferably, the values (l) and (m) are six and seven, respectively, thus, the synchronization code patterns are 10000001 and 100000001, respectively. These patterns are stored in the memory (MEM) 4 selectively via the AND-circuit 37a or 38a in accordance with the output from the AND-circuit 35 or 36. The output of the AND-circuit 35 or 36 also switches the operation of the encoder/modulator (MOD) 13.

Contents of the memory (MEM) 4 are edited and transmitted to the transmission line (not shown) from the output terminal 6. Another part of the memory (MEM) 4 can be used as an output buffer memory (BUF) 14. In this case, the insertion unit of a dummy code can be located at the output side of the memory (MEM) 4.

Following is a description of the facsimile receiving device referring to FIG. 2. The register (REG) 81 has in its storage the first synchronization pattern (1000 . . . 001) composed of a series of l number of zeros with the signal "1" before and after, while the register (REG) 85 has in its storage the second synchronization pattern with a series of m number of zeros with the signal "1" before and after. When the pattern of the input signal applied from the input terminal 6a to the register (REG) 83 coincides with one of the above synchronization patterns, the comparison circuit (COMP) 82 or (COMP) 84 generates output and each reverses flip-flop 90. The outputs of comparison circuits (COM) 82 and 84 are applied to the pulse generators (PG) 86 and 87 respectively as trigger signals. When these pulse generators receive trigger signals from the comparison circuits, (l plus 2) number of pulses and (m plus 2) number of pulses are generated and are applied to the AND-circuit 88 and 89 respectively. Therefore, while the pulse generators generate pulses, that is during the period of synchronization code, the AND-circuits 88 and 89 close. Therefore, the output of the AND-circuit 89, is picture signals which are the received signals with synchronization signals eliminated. The output of the AND-circuit 89 is applied to the "1" elimination circuit 7. This circuit serves to eliminate the "1" inserted for each series of a given number of (such as 5) zeros for the purpose of preventing confusing of control code and picture signal in the "1" insertion circuit 2 on the transmitter's side. In the present embodiment, the register (REG) 75 supposedly stores the value "5". The counter (CNT) 73 counts the number of zeros in the picture signal by the input signal provided through the inverter 71. If there is a signal "1" in the picture signal, the counter (CNT) 73 is reset via the OR-circuit 72. When the contents of the counter (CNT) 73 becomes 5, the comparison circuit (COMP) 74 generates output. Said output resets the counter (CNT) 73 via the OR-circuit 72. At the same time, said output is applied to the AND-circuit 78 via the inverter 76 and the 1-bit delay circuit (D) 77. Therefore, the AND-circuit 78 closes during the one bit that follows the 5 zeros. Thus, the "1" existing in that bit is eliminated. The output of the AND-circuit 78 is applied to either the first demodulator (DEM 1) 93 or the second demodulator (DEM 2) 94 via either the AND-circuit 91 or 92 according to the ON or OFF status of the flip-flop 90. These demodulators responding to the operation of the encoder/modulator (MOD) 13 in FIG. 1, conduct demodulation employing RAC or RLC method and the result is fed to an outside device from the output terminal 6b.

Figure 1A:
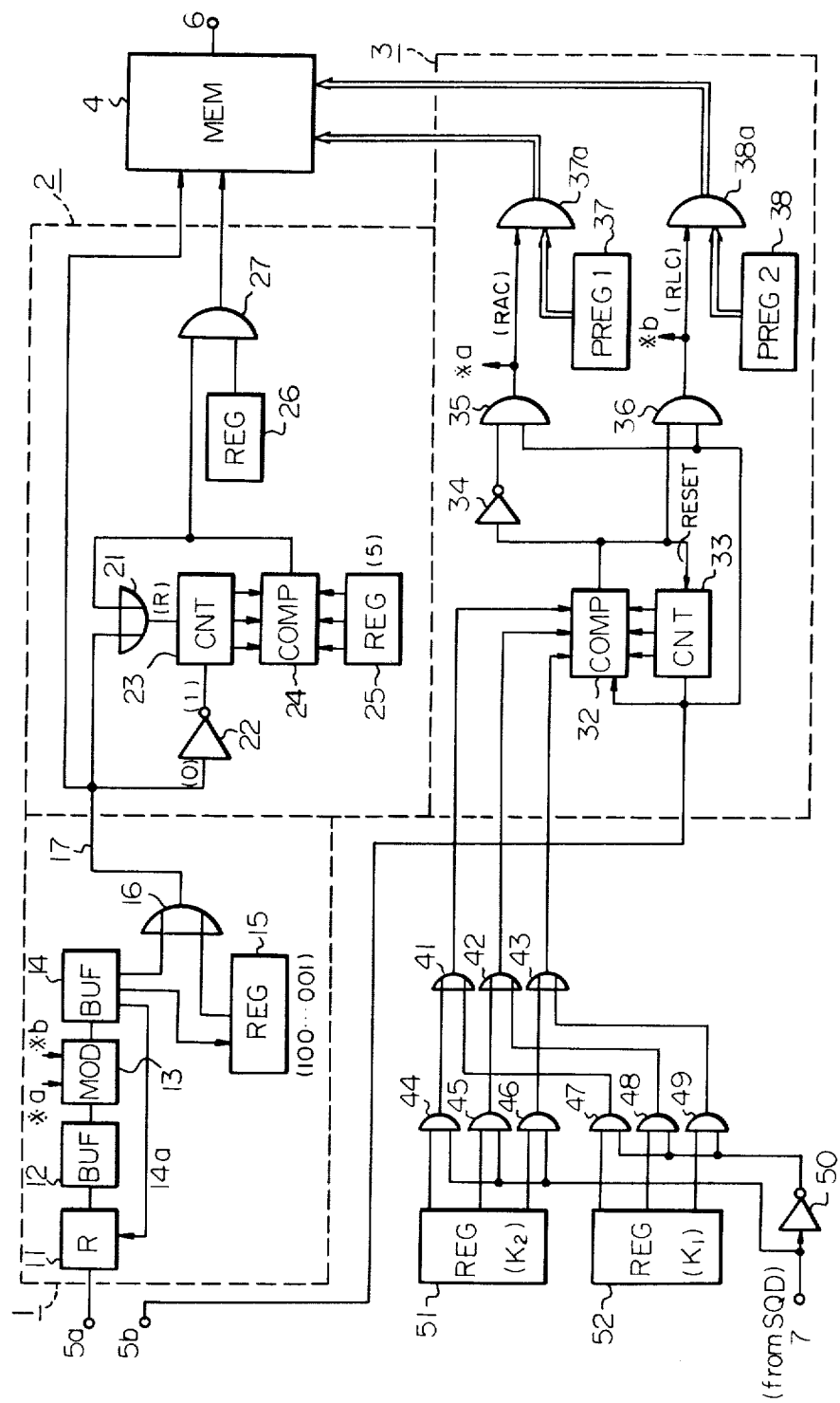
FIG. 1A is a block diagram of the modification of FIG. 1.

FIG. 1A is the modification of the embodiment of FIG. 1.

There have known two coding systems, the one dimensional encoding system (RLC=Run Length Coding is a representative example), and line-by-line encoding system (RAC=Relative Address Coding is a representative example). The latter is better in view of the data supressing. The RLC system encodes a binary information on each scanning line without using the binary (or black/white) information on other scanning lines, therefore, when there is a one bit of transmission error on the information on a scanning line, that error makes no effect to the information on other scanning lines. On the other hand, the RAC system encodes a binary information on each scanning line taking into consideration the binary information on previously encoded scanning lines, and therefore, when there is a one bit of transmission error on the information on the particular scanning line, that error disturbs the picture quality of a plurality of scanning lines.

Accordingly, in order to satisfy both the data supression effect, and the desired picture quality, the combination of RLC encoding system and RAC encoding system is proposed. In that combination encoding system, the RAC encoding system is performed for k scanning lines (k is an integer), and next scanning line is encoded by RLC encoding system. Next k lines are encoded by RAC system. By repeating the k lines of RAC encoding system and one line of RLC encoding system, the effect of one bit error in a transmission line is restricted within k scanning lines.

According to the embodiment of FIG. 1A, that number of (k) is switched according to the error rate of a transmission line or the transmission quality of a transmission line. That is to say, when the transmission quality is good and there is few errors, the number (k) is increased to enhance the information suppressing effect. On the other hand, when the transmission quality is bad and there are many transmission errors, the number (k) is decreased in order to prevent the deterioration of a picture quality. The switching of the number of (k) is performed by switching synchronization codes according to the transmission quality of the transmission line, either by manually, or by automatically.

When the switching is performed automatically, the transmission quality must be automatically measured. The SQD output of a modem (modulator-demodulator) device can be utilized for that purpose. The SQD output of a modem is OFF when the transmission quality of a reception circuit is in a good condition, and that SQD output is ON when the transmission quality is in bad condition. Since the transmission circuit and the reception circuit are provided by a single pair of round transmission circuit, and further, when a plurality of circuits are multiplexed, the transmission circuit and the reception circuit are allocated in a narrow frequency interval with each other, the transmission quality of the transmission line has the strong dependency with that of the reception quality. Accordingly, the quality of the reception circuit obtained by the SQD output of a modem can represent the quality of the transmission circuit, also.

The SQD output according to the transmission quality is conventional, and since the CCITT, which is the International Telegraph and Telephone Consulative Committee organized as one of the subsidiary organizations of the United Nations, issued the recommendation V24 including that SQD output, any commercial modem (modulator-demodulator) which satisfies that recommendation V24 has the facility of that SQD output.

Therefore, according to the present invention, when the SQD output of a modem of a reception circuit is OFF, the quality of the transmission circuit is presumed to be in good condition, and the number (k) of lines encoded by the line-by-line encoding system (RAC) is switched to the larger predetermined value ($k_1$), and when the SQD output of a modem in ON, the quality of the transmission circuit is presumed to be in wrong condition, and the number (k) scanning lines encoded by the line-by-line encoding system (RAC) is switched to the smaller predetermined value ($k_2$). Of course the relationship $k_1 > k_2$ is satisfied, preferably, the value $k_1$ is four, and the value $k_2$ is two in the practical embodiment.

FIG. 1A shows the block diagram of the present facsimile transmitter in which the switching between the RAC encoding system and the RLC encoding system is performed according to the transmission quality. In FIG. 1A, the insertion circuit for a dummy code 1, the insertion circuit of "1" represented by the reference numeral 2, and the memory 4 are the same as those in FIG. 1. Also, in the synchronization signal generation circuit 3, the comparator 32, the counter 33, the inverter 34, the AND circuits 35, 36, 37a, and 38a, the pattern register 37 and the pattern register 38 are the same as the corresponding ones in FIG. 1. The difference between the apparatuses of FIG. 1 and FIG. 1A is that the content of the register 3 in FIG. 1 is switched in the embodiment of FIG. 1A according to the transmission quality.

In FIG. 1A, the reference numerals 41, 42 and 43 are OR-circuits, 44 through 49 are AND-circuits, 50 is an inverter, 51 is a register for storing the predetermined value ($k_2$), 52 is a register for storing the predetermined value ($k_1$), and 7 is an input terminal for receiving the SQD output from a modem.

The comparator 32 in FIG. 1A compares, when the terminal 5b provides the synchronization control signal to the comparator 32, the content of the counter 33 with either the content of the register 51 or the content of the register 52, and said comparator 32 provides the output signal when the former is larger than the latter. Of course, the contents of the registers 51 and 52 are applied to the comparator 32 through the AND-circuits 44 through 49 and the OR-circuits 41 through 43.

In FIG. 1A, when the SQD output applied to the terminal 7 is OFF, that is to say, when the transmission quality is in good condition, the output of the inverter 50 is ON, and the AND-circuits 44 through 46 are closed and the AND-circuits 47 through 49 are opened. Therefore, the content ($k_1$) stored in the register 52 is applied to the comparator 32 through the AND-circuits 47 through 49 and the OR-circuits 41 through 43. On the other hand, when the SQD output applied to the terminal 7 is ON, that is to say, when the transmission quality is in bad condition, the AND-circuits 47 through 49 are closed and the AND-circuits 44 through 46 are opened, then, the content ($k_2$) stored in the register 51 is applied to the comparator 32.

Accordingly, it should be appreciated that the content of the register 31 in FIG. 1 is switched according to the transmission quality by the circuit configuration of FIG. 1A.

The facsimile receiver for receiving the facsimile signal from the transmitter of FIG. 1A can be the same as the facsimile receiver of FIG. 2, since each synchronization code attached to each scanning line is also switched according to the transmission quality, and that synchronization code includes the information whether the scanning line is encoded by the RAC system, or the RLC system.

Next, some modificatin of a control code or a synchronization code is described.

The control signal is not limited to the pattern which comprises an (n) number of continuous 0's and a pair of 1's at both ends of said 0's, but an arbitrary configuration of (m) number of bits can be utilized as a control signal. In this case, the first $m_1$ bits of the m bits of the control signal are called the fundamental code, and the succeeding $m_2$ bits ($m = m_1 + m_2$) are called the supplement code. The first bit of the supplement code has a predetermined sign (for instance "0"). In order to distinguish the control signal from the information to be transmitted, when the information has the same pattern as the fundamental code, the idle signal having the opposite sign of the first sign of the supplement code is automatically inserted in the information in the transmitter. And said idle sign is automatically deleted in the receiver. In this case, when a plurality of control signals are defined, the fundamental code ($m_1$ bits) of all the control signals are the same, and the supplement code specifies each control code. An example in which four control signals are defined is shown in the table below where the fundamental code is (10101) having five bits ($m_1 = 5$), and the first bit of the supplement codes is (0).

| Control signal | Bit Pattern | | | | | | | | |
|---|---|---|---|---|---|---|---|---|---|
| | fundamental | | | | | supplement | | | |
| Control Signal (1) | 1 | 0 | 1 | 0 | 1 | 0 | | | |
| Control Signal (2) | 1 | 0 | 1 | 0 | 1 | 0 | 1 | | |
| Control Signal (3) | 1 | 0 | 1 | 0 | 1 | 0 | 1 | 0 | |
| Control Signal (4) | 1 | 0 | 1 | 0 | 1 | 0 | 1 | 0 | 1 |

In the case above four control signals are defined, an idle signal "1" is automatically inserted in the transmitter when the information to be transmitted has the same pattern as the fundamental code (= 10101), thus, when the information is 101010 the actual transmitted signal is 1010110. As the idle signal which resides at the second position from the right end of the actual transmitted signal is deleted in the receiver automatically, a clean output having the original pattern 101010 is output at the receiver. The control signals as defined can also been utilized as a dummy code and/or a switching trigger for the transmission system.

The above description is provided based on an example of facsimile communication. But the objective of the present invention is not restricted to facsimile only. Rather, it is applicable to all other digital communication.

From the foregoing it will now be apparent that a new and improved digital signal control system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A method for controlling a facsimile system characterized in that the scanning lines of a picture signal are encoded so that (k) number of continuous scanning lines are encoded by a relative address encoding system and the next one scanning line is encoded by run length encoding system and that sequence is repeated, a pair of synchronization codes are defined for each encoding system, and each synchronization code is positioned at the head of each scanning line of a picture signal, each of the synchronization codes have $m_1$ and $m_2$ number of continuous 0's inserted between a pair of 1's, a facsimile transmission station interpolates "1" for each series of $(MIN(m_i) - 1)$ number of continuous 0's of the picture signal in order to distinguish the picture signal from synchronization codes where $MIN(m_i)$ is the minimum value among $m_i$ and i is 1 or 2, and a receiving station eliminates the interpolated "1" to provide a clean output, wherein the value of (k) is switched according to the instantaneous quality of a communication line so that the value (k) when said quality is good is larger than that when said quality is bad.

2. The invention as defined in claim 1, wherein the value of (k) when said quality is good is 4, and the value of (k) when said quality is bad is 2.

3. The invention as defined in claim 1, wherein said quality of an instantaneous communication line is provided as an SQD output of a modem.

4. A digital facsimile communication system having a transmitter and a receiver, a transmitter comprising;
    (a) a first input terminal for receiving a digitalized facsimile signal,
    (b) a second input terminal for receiving a timing pulse which appears in every scanning line,
    (c) a dummy code insertion circuit for encoding the input signal applied to the first input terminal so that the continuous (k) number of scanning lines are encoded to a relative address code and the next scanning line is encoded to a run length code and that sequence is repeated, and inserting in the output of the dummy code insertion circuit the signal pattern (10000 . . . 0001) which has a predetermined number of continuous 0's inserted between a pair of 1's,
    (d) a "1" insertion circuit for inserting the signal "1" in the output signal of the dummy code insertion circuit when said output signal has more continuous 0's than the predetermined number,
    (e) a synchronization signal generation circuit for alternately generating one of two synchronization patterns each of which has continuous 0's inserted between a pair of 1's,
    (f) a third input terminal for receiving an instantaneous quality of a communication line,
    (g) a pair of registers each storing the value ($k_2$) and ($k_1$) and the outputs of those registers being switched according to the input signal applied to the third input terminal, (h) a counter for counting the pulses applied to the second input terminal,
(i) a comparator for comparing the output of said counter with one of the outputs of said registers and causing the selection of one of the relative address code and the run length code and the related synchronization patterns in the synchronization signal generation circuit,
(j) a digital memory for storing the outputs of said "1" insertion circuit and said synchronization signal generation circuit, and
(k) an output terminal connected to the output of said digital memory, and a receiver comprising
(l) an input terminal for receiving the signal relating to signal on the output terminal of the transmitter through a communication line,
(m) means for deleting the synchronization signal from the signal thus received in the input terminal,
(n) means for deleting the signal "1" inserted in the "1" insertion circuit of the transmitter,
(o) means for decoding the signal from a relative address code and a run length code, and
(p) an output terminal connected to the output of the decoding means to provide the received digital facsimile signal.

5. The invention as defined in claim 4, wherein said two synchronization patterns are 10000001 which has six continuous 0's inserted between a pair of 1's, and 100000001 which has seven continuous 0's inserted between a pair of 1's, and value $k_1$ is 4 and the value $k_2$ is 2.

* * * * *